United States Patent
Klein

(10) Patent No.: US 11,657,586 B1
(45) Date of Patent: May 23, 2023

(54) SYSTEMS AND METHODS FOR AUGMENTED REALITY VIEWING BASED ON DIRECTLY MAPPED POINT CLOUD OVERLAYS

(71) Applicant: Illuscio, Inc., Culver City, CA (US)

(72) Inventor: Alexandre Leuckert Klein, Novo Hamburgo (BR)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 18/064,658

(22) Filed: Dec. 12, 2022

Related U.S. Application Data

(63) Continuation of application No. 17/822,613, filed on Aug. 26, 2022, now Pat. No. 11,538,228.

(51) Int. Cl.
| | | |
|---|---|---|
| *G06K 9/00* | (2022.01) | |
| *G06T 19/00* | (2011.01) | |
| *G06T 17/00* | (2006.01) | |
| *G06T 7/20* | (2017.01) | |
| *G06V 10/44* | (2022.01) | |
| *G06T 7/70* | (2017.01) | |

(52) U.S. Cl.
CPC ............. *G06T 19/006* (2013.01); *G06T 7/20* (2013.01); *G06T 7/70* (2017.01); *G06T 17/00* (2013.01); *G06V 10/44* (2022.01); *G06T 2207/10024* (2013.01); *G06V 2201/07* (2022.01)

(58) Field of Classification Search
CPC .......................................... G06T 2207/10028
See application file for complete search history.

(56) References Cited

U.S. PATENT DOCUMENTS

| | | | |
|---|---|---|---|
| 10,325,370 B1* | 6/2019 | Jabari | G06T 7/344 |
| 10,460,523 B1 | 10/2019 | Haddy | |
| 11,030,812 B2 | 6/2021 | Kelsey et al. | |
| 11,378,454 B1 | 7/2022 | Bogacz et al. | |
| 11,538,228 B1* | 12/2022 | Klein | G06T 17/00 |
| 2014/0144981 A1* | 5/2014 | Schoner | G06K 7/10297 |
| | | | 235/375 |
| 2014/0192050 A1* | 7/2014 | Qiu | G06V 20/653 |
| | | | 345/420 |
| 2015/0154679 A1* | 6/2015 | Fonte | G02C 13/005 |
| | | | 703/1 |
| 2015/0301592 A1 | 10/2015 | Miller | |

(Continued)

*Primary Examiner* — Hadi Akhavannik
(74) *Attorney, Agent, or Firm* — Ansari Katiraei LLP; Arman Katiraei; Sadiq Ansari

(57) ABSTRACT

An augmented reality system enhances or augments the view of a real-world object by replacing different portions of the object with visualizations of non-visible data encoded for those different portions. The system may receive an image that captures visible properties of an object from a particular perspective. The system may select a model with data points that are generated from scanning the object and that encode visible and non-visible properties of the object. The system may align the model to match the object at the particular perspective, may map the non-visible properties from a set of the data points to an object part that is represented and aligned with the set of data points, and may present an augmented reality view in which the visible properties at the object part from the particular perspective are replaced with a visualization of the non-visible properties from the set of data points.

20 Claims, 6 Drawing Sheets

(56) References Cited

U.S. PATENT DOCUMENTS

| | | | |
|---|---|---|---|
| 2015/0312426 A1* | 10/2015 | Schoner | G06F 16/50 |
| | | | 235/375 |
| 2016/0378294 A1 | 12/2016 | Wright et al. | |
| 2018/0232942 A1 | 8/2018 | Wang et al. | |
| 2019/0274762 A1 | 9/2019 | Kim et al. | |
| 2020/0133405 A1 | 4/2020 | Chan | |
| 2021/0012166 A1* | 1/2021 | Braley | G06T 7/74 |

* cited by examiner

SYSTEMS AND METHODS FOR AUGMENTED REALITY VIEWING BASED ON DIRECTLY MAPPED POINT CLOUD OVERLAYS

CLAIM OF BENEFIT TO RELATED APPLICATIONS

This application is a continuation of U.S. non-provisional application Ser. No. 17/822,613 entitled "Systems and Methods for Augmented Reality Viewing Based on Directly Mapped Point Cloud Overlays", filed Aug. 26, 2022 and issued as U.S. Pat. No. 11,538,228. The contents of application Ser. No. 17/822,613 are hereby incorporated by reference.

BACKGROUND

Augmented reality and/or mixed reality ("AR/MR") has involved adding digital models into a view of the real-world. For instance, AR/MR viewers may present a digital model of furniture in a room so that the user may visualize how the furniture fits in the room with existing furniture.

Some AR/MR games have introduced interactivity in which the digital model may be affected by objects in the real-world environment. For instance, an AR/MR game may show a digital model of a ball bouncing off real-world objects.

The digital models in these and other AR/MR applications remain detached and independent of the objects in the real-world environment. In other words, the AR/MR applications do not provide a view in which the digital models directly enhance or augment the real-world objects.

DETAILED DESCRIPTION OF PREFERRED EMBODIMENTS

The following detailed description refers to the accompanying drawings. The same reference numbers in different drawings may identify the same or similar elements.

Provided are systems and methods for augmented reality ("AR") viewing based on point cloud overlays that are directly mapped to real-world objects. The point cloud overlay mapping provides a new augmented reality and/or mixed reality ("AR/MR") application in which a real-world object is directly enhanced or augmented by the point cloud overlays.

In some embodiments, a point cloud AR/MR mapping system may enhance or augment the view of a real-world object by identifying points of reference on the real-world object, by aligning a point cloud that is a digital model of the real-world object over the real-world object based on the identified points of reference, and by enhancing or augmenting the presentation for different portions of the real-world object in the AR/MR view with visualizations of non-visible data encoded for those different portions in the aligned point cloud. In some embodiments, the point cloud AR/MR mapping system may generate the AR/MR view by directly mapping values from the aligned point cloud data points to the enhanced or augmented portions of the real-world object, and/or by replacing the visible data from those portions of the real-world object with the visualizations that are created from rendering the non-visible data from the directly mapped values of the aligned point cloud data points.

Accordingly, the point cloud AR/MR mapping system does not present digital models or objects that are rendered from point clouds next to or in conjunction with the real-world objects. Instead, the point cloud AR/MR mapping system may alter the presentation of the real-world objects in a AR/MR viewer so that non-visible data about specific parts of the objects are attached to and presented at the corresponding specific parts of the object in the AR/MR viewer in place of the visible data from a non-augmented or live view of the object.

In some embodiments, the point cloud AR/MR mapping system may provide filters that change the non-visible data that is mapped from a point cloud model of a real-world object to corresponding parts of the real-world object. For instance, the point cloud model may contain data for different hyperspectral bands of non-visible light (e.g., near-infrared, far-infrared, ultraviolet, etc.) captured from the surface of the object, and the point cloud AR/MR mapping system may apply the filters to selectively map and visually present the non-visible light (e.g., via an intensity mapping or non-visible light to red, green, and blue color values mapping) captured in each band across the surface of the object so that the user may visually see the data associated with each of several hyperspectral bands separately.

Figure 1:
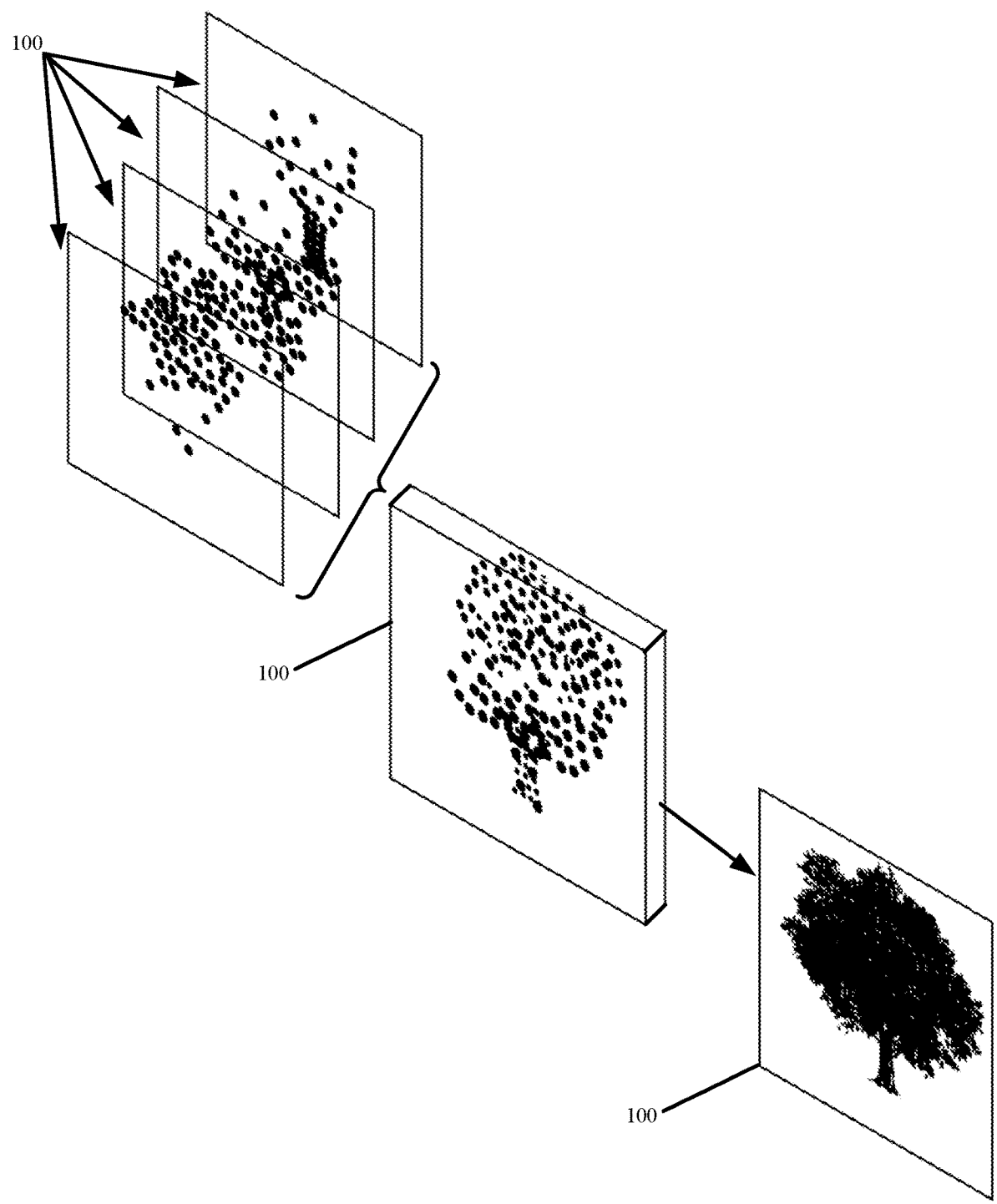
FIG. 1 illustrates an example of a point cloud that may be generated as a model of real-world object and that may be mapped over the real-world object as part of the point cloud augmented reality and/or mixed reality ("AR/MR") view in accordance with some embodiments presented herein.

FIG. 1 illustrates an example of a point cloud 100 that may be generated as a model of real-world object and that may be mapped over the real-world object as part of the point cloud augmented AR/MR view in accordance with some embodiments presented herein. In some embodiments, point cloud 100 may be generated by the point cloud AR/MR mapping system using one or more of a 3D or depth-sensing camera, a structured light or patterned light imaging device, Light Detection and Ranging ("LiDAR") sensor, Magnetic Resonance Imaging ("MRI") device, Positron Emission Tomography ("PET") scanning device, Computerized Tomography ("CT") scanning device, time-of-flight device, and/or other imaging equipment for 3D objects, volumetric objects, or 3D environments.

The data points of point cloud 100 may differ from pixels of a two-dimensional ("2D") image, because certain regions of point cloud 100 may have no data points, lower densities of data points, and/or higher densities of data points based on varying amounts of visual information that is detected or scanned at those regions. Additionally, the position of the point cloud data points may be defined in 3D space using x, y, and z coordinate values. In contrast, pixels of a 2D image are defined in 2D space and have a uniform density or fixed arrangement that is defined by the resolution of the 2D image. In other words, the point cloud data points may have a non-uniform placement or positioning, whereas the 2D image may have pixel data for each pixel of a defined resolution (e.g., 640×480, 800×600, etc.).

Each point cloud data point may be defined with a plurality of elements. The plurality of elements may include a first set of positional elements, and a second set of non-positional or descriptive elements.

The positional elements may include coordinates within 3D space. For instance, each point cloud data point may include x-coordinate, y-coordinate, and z-coordinate elements to capture the position of a corresponding physical point from an imaged surface, feature, or article of the 3D object or the 3D environment in 3D space.

The non-positional elements may include information about the detected characteristics of the surface, feature, or article imaged at a corresponding position in 3D space. The characteristics may correspond to a detected color. The color may be represented using red, green, blue ("RGB"), and/or other values. In some embodiments, a data point may have multiple sets of non-positional elements with each set of non-positional elements storing intensity values or other hyperspectral values detected across a different band of the electromagnetic spectrum. For instance, a first set of non-positional elements may store values measured in the 800 to 2,500 nanometer wavelengths for near-infrared light, and a second set of non-positional elements may store values measured in the 10 to 400 nanometer wavelengths for ultraviolet light from the position of the real-world object identified by the associated positional elements of the data point.

In some embodiments, the non-positional element may store other measured or derived characteristics including the chrominance, hardness, translucence, reflectivity, luminance, metallic characteristics, roughness, specular, diffuse, albedo, index of refraction ("IOR"), and/or other properties from the imaged surface, feature, or article position. In some embodiments, the non-positional elements may directly identify a material property or other classification for a data point. For instance, a first data point may be defined with a non-positional element with a value that identifies the material property of "aluminum", a second data point may be defined with a non-positional element with a value that identifies the material property of "steel", and a third data point may be defined with a non-positional element with a value that identifies the material property of "plastic".

In some embodiments, the characteristics may be related to properties of the device used to generate each of data points. For instance, the characteristics may include a Tesla strength value to quantify the strength of the magnetic field that was used in detecting and/or imaging the surface, feature, or article represented by a particular point cloud data point. In some embodiments, the non-positional elements may include energy, audio or sound, and/or other characteristics of the device or the object being imaged. Accordingly, the non-positional elements can include any property of the imaged surface, feature, or article (e.g., hue, saturation, brightness, reflectivity, etc.) or of the device used to capture the object part at a corresponding data point in 3D space.

Each point cloud data point may include an array of elements. The array of elements may provide the positioning of the data point in 3D space as well as one or more characteristics of that data point. For instance, a point cloud data point may be stored and/or represented as an array of elements with some combination of x-coordinate, y-coordinate, z-coordinate, RGB values, values measured in the near-infrared band, values measured in the far-infrared band, values measured in the ultraviolet band, values measured in other hyperspectral bands, chrominance, hardness, translucence, reflectivity, luminance, metallic characteristics, roughness, specular, diffuse, albedo, IOR, tesla, and/or other values.

In some embodiments, point cloud 100 may be generated from the output of two or more devices. For instance, a first imaging device (e.g., a LiDAR sensor) may determine the position for each data point in 3D space, and a second imaging device (e.g., a high-resolution camera) may measure or capture the characteristics or other non-positional information for each data point. One or more photogrammetry techniques may be used to consolidate the data from the first imaging device and the second imaging device, and to create the point cloud 100.

Figure 2:
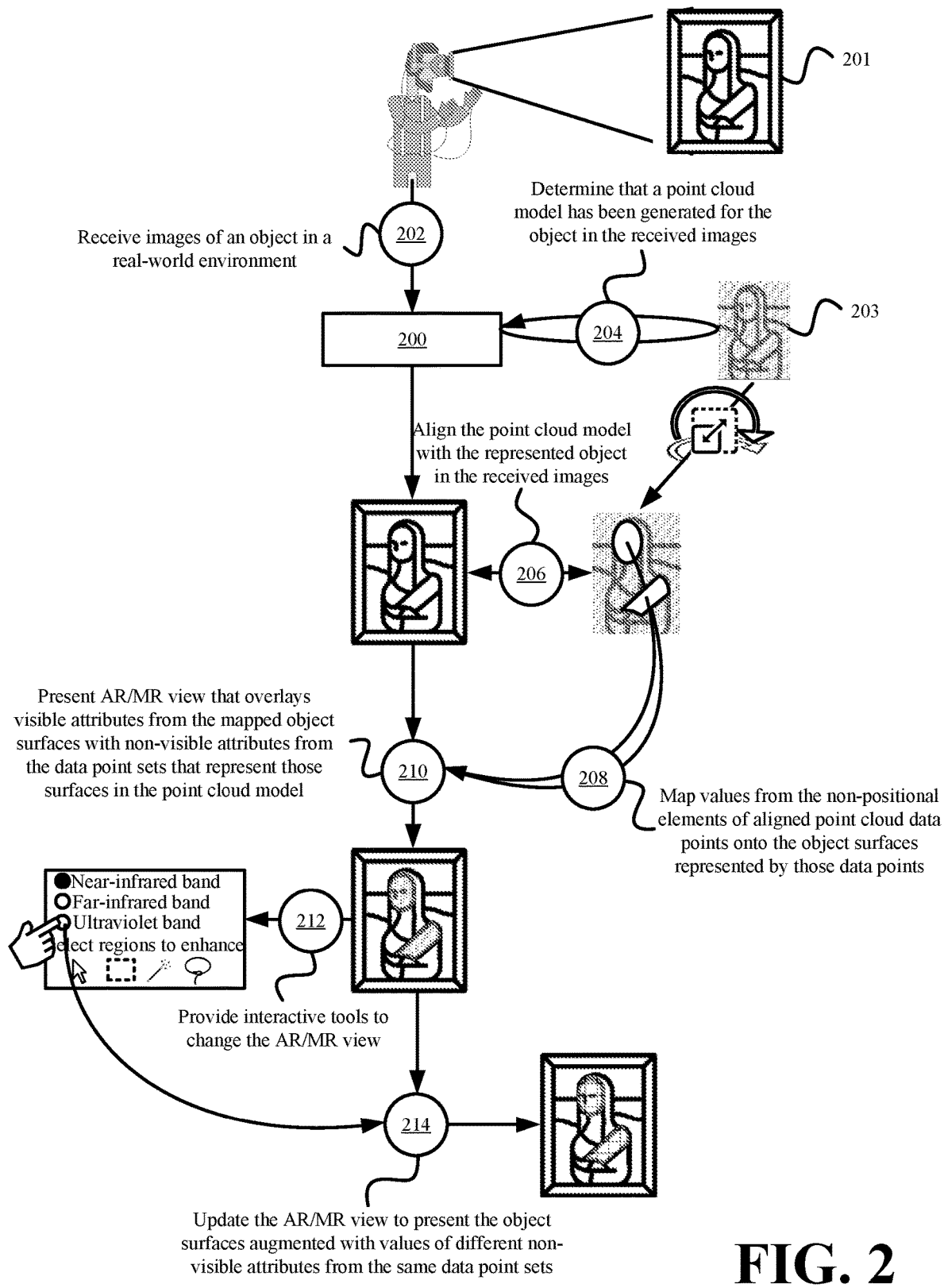
FIG. 2 illustrates an example of enhancing or augmenting the view of a real-world object via the mapping of point cloud overlays directly onto the surface or specific parts of the real-world object in accordance with some embodiments presented herein.

FIG. 2 illustrates an example of enhancing or augmenting the view of a real-world object via the mapping of point cloud overlays directly onto the surface or specific parts of the real-world object in accordance with some embodiments presented herein. Point cloud AR/MR mapping system 200 may include or may be integrated as part of a AR/MR headset and/or device with one or more cameras and hardware processors. For instance, the AR/MR device may be a smartphone device with a camera that captures images, and a display that presents the enhanced or augmented view of the objects within the captured images.

Point cloud AR/MR mapping system 200 may receive (at 202) images of at least one object 201 in a real-world environment from the AR/MR device. In some embodiments, the AR/MR device may continuously capture the images (e.g., at 30 frames per second) as part of capturing a live view of the real-world environment.

Point cloud AR/MR mapping system 200 may analyze object 201 (e.g., the structural and/or non-positional characteristics for unique identifying features of object 201) appearing within the images, and may determine (at 204) that point cloud model 203 has been previously generated for object 201. Point cloud model 203 may be a digital model that was previously generated from scanning object 201 and/or mapping the structural and descriptive qualities of object 201.

In some embodiments, point cloud AR/MR mapping system 200 may determine (at 204) that the structural outline, positional arrangement, texture, form, and/or other surface qualities of object 201 match or are similar by a threshold amount to the structural outline, positional arrangement, texture, form, and/or other surface qualities encoded in the positional elements of the data points from point cloud model 203. In some embodiments, point cloud AR/MR mapping system 200 may determine (at 204) that the patterns or variations of colors and/or other descriptive characteristics of object 201 match or are similar by the threshold amount to the patterns or variations or colors and/or other descriptive characteristics encoded in the non-positional elements of the data points from point cloud model 203. In some other embodiments, point cloud AR/MR mapping system 200 may determine (at 204) that unique identifying features comprised of a combination of structural patterns and descriptive characteristics from different parts of object 201 are encoded in the positional and non-positional elements of different sets of data points at positions in point cloud model 203 that match the positions of the unique identifying features about a surface of object 201.

Point cloud AR/MR mapping system 200 may align (at 206) point cloud model 203 with object 201. Aligning (at 206) point cloud model 203 may include sizing, rotating, and/or otherwise positioning point cloud model 203 so that the sets of data points that represent the unique identifying features of object 201 are of the same size, scale, and positions as the unique identifying features captured in the images. For instance, the closer the AR/MR device is to object 201, the larger object 201 will appear in the received (at 202) images. Accordingly, point cloud AR/MR mapping system 200 may zoom into point cloud model 203 so that the size and positioning of the data points are commensurate to the size and positioning of the represented points from object 201 in the received (at 202) images. Similarly, the AR/MR device may image object 201 at an angle or from a rotated position. Aligning (at 206) point cloud model 203 may include rotating point cloud model 203 so that the data points are at a similar angle or are presented with a similar rotations as the represented points from object 201 in the received (at 202) images.

Point cloud AR/MR mapping system 200 may map (at 208) characteristics or non-visible data from the non-positional elements of one or more sets of aligned (at 206) point cloud data points onto the portions or surfaces of object 201 represented by those one or more sets of aligned (at 206) point cloud data points in the AR/MR view generated by the AR/MR device. In some embodiments, point cloud AR/MR mapping system 200 may receive user input that specifies which portions or surfaces of object 201 to enhance or augment with the non-visible data from point cloud model 203, and the mapping (at 208) may include identifying the sets of data points that represent and/or are aligned with the user selected portions or surfaces of object 201. In some other embodiments, point cloud AR/MR mapping system 200 may automatically select portions or surfaces of object 201 to enhance or augment with the non-visible data from point cloud model 203, and the mapping (at 208) may include identifying the sets of data points that represent and/or are aligned with the automatically selected portions or surfaces of object 201.

As a result of the mapping (at 208), point cloud AR/MR mapping system 200 may present (at 210) a first enhanced or augmented view of the real-world environment through the AR/MR headset. Presenting (at 210) the first enhanced or augmented view of the real-world environment may include replacing or overlaying the visible attributes from the selected portions or surfaces of object 201 with the non-visible attributes that are stored in the non-positional elements of the sets of data points from point cloud model 203 that represent and/or are aligned with those selected portions or surfaces.

The non-positional elements may store measurements that were obtained at the selected portions or surfaces for different non-visible light bands of the electromagnetic spectrum during a hyperspectral capture and/or imaging of object 201. Accordingly, point cloud AR/MR mapping system 200 may map (at 208) and present (at 210) measurements or values recorded for a first electromagnetic spectrum band onto various portions or surfaces of object 201. Presenting (at 210) the values recorded for a first electromagnetic spectrum may include generating a visualization based on the values. For instance, the first enhanced or augmented view may convert infrared properties detected at the enhanced or augmented portions or surfaces of object 201 into a visible scale or visual representation that is presented (at 210) over the enhanced or augmented portions or surfaces of object 201, while other portions or surfaces of object 201 may be presented (at 210) without enhancement or augmentation (e.g., presenting the other portions or surfaces with imaged RGB values).

Point cloud AR/MR mapping system 200 may provide (at 212) a user interface ("UI") with one or more interactive elements by which the user may change the mapping and/or the augmented or enhanced reality view of object 201. For instance, point cloud AR/MR mapping system 200 may provide (at 212) interactive elements for switching the augmented or enhanced reality view to visualize the object with different hyperspectral data and/or values recorded for different bands of the electromagnetic spectrum. In some embodiments, the interactive elements may be used to select portions or surfaces of object 201 to augment or enhance with the non-visible data stored in the point cloud data points.

Point cloud AR/MR mapping system 200 may receive user input for changing the augmented or enhanced reality view to present measurements or values recorded for a second electromagnetic spectrum band onto the surface of object 201. In response to the user input, point cloud AR/MR mapping system 200 may realign point cloud model 203 with object 201 if there was any change or movement with respect to the position of object 201 in the received (at 202) images, may select the sets of data points that are aligned with the portions or surfaces of object 201 to be augmented or enhanced, may map the values recorded for the second electromagnetic spectrum band from the non-positional elements of the selected sets of data points onto the corresponding points for the augmented or enhanced portions or surfaces of object 201, and may update (at 214) the AR/MR view to present the augmented or enhanced portions or surfaces of object 201 with a visualization that is generated from the second electromagnetic spectrum band values contained in the non-positional elements of the selected sets of data points representing those augmented or enhanced portions or surfaces of object 201 in point cloud model 203. In this manner, the user may switch the AR/MR view of object 201 to visualize different properties that are directly mapped or overlaid onto selected portions or surfaces of object 201 at the exact positions where those different properties were obtained from imaging, measuring, and/or otherwise scanning object 201.

Figure 3:
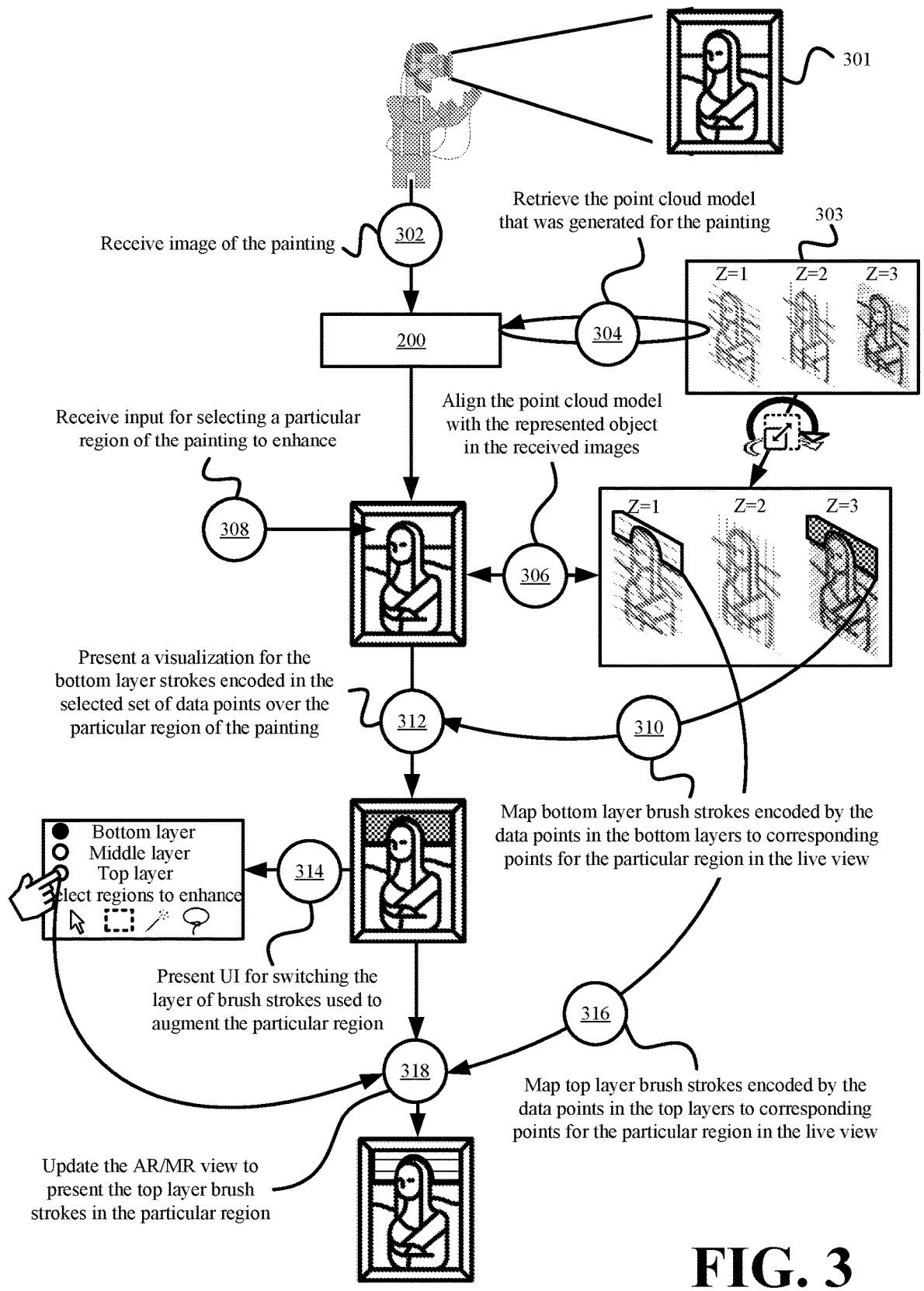
FIG. 3 illustrates an example of directly mapping different data from the non-positional elements of a point cloud to a real-world object presented in an AR/MR view in accordance with some embodiments presented herein.

FIG. 3 illustrates an example of directly mapping different data from the non-positional elements of a point cloud to a real-world object presented in an AR/MR view in accordance with some embodiments presented herein. To initiate the AR/MR view, a user may position painting 301 within a field-of-view of a camera or imaging device. The camera or imaging device may be integrated as part of an AR/MR headset or other AR/MR device (e.g., a smartphone, a tablet, a laptop computer, etc.). The camera or imaging device may capture an image of painting 301, and may provide (at 302) the image to point cloud AR/MR mapping system 200.

Point cloud AR/MR mapping system 200 may analyze the image to determine that painting 301 is the target object for the enhanced or augmented visualization, and to uniquely identify painting 301 based on features, structures, and/or characteristics of painting 301. In some embodiments, point cloud AR/MR mapping system 200 may perform image recognition, matching, modeling, and/or querying to obtain one or more unique identifiers for painting 301. The one or more unique identifiers may include the name of painting 301, the artist that created painting 301, and/or an alphanumeric identifier that identifies painting 301.

Point cloud AR/MR mapping system 200 may retrieve (at 304) point cloud 303 that was previously generated from scanning painting 301. In some embodiments, point cloud 303 may be identified with the same one or more unique identifiers as painting 301. In some other embodiments, point cloud AR/MR mapping system 200 may determine that the data points within point cloud 303 produce the same features, structures, and/or characteristics that were used to identify painting 301.

Point cloud 303 may be generated from a depth capture of painting 301. For instance, the data points of point cloud 303 may capture the positioning and characteristics (e.g., color) of paint applied at different layers of painting 301 via an X-ray scanning or Optical Coherence Tomography ("OCT") of painting 301. Data points representing the topmost layer of paint (e.g., paint applied on a first z plane) may be encoded with a first set of color values for the non-positional elements, whereas data points representing a lower layer of paint may have some of the same x and y coordinates but a second z coordinate (e.g., a second z plane) and a second set of color values for the non-positional elements. The positional elements of the data points representing the different layers of painting 301 may capture the brush strokes applied by the artist at each layer.

Point cloud AR/MR mapping system 200 may align (at 306) point cloud 303 with the live view of painting 301 captured by the camera or imaging device. As before, the aligning (at 306) may include sizing and orienting point cloud 303 so that its data points may be superimposed or overlaid atop the exact positions of painting 301 in the live view represented by those data points.

Point cloud AR/MR mapping system 200 may receive (at 308) input for enhancing or augmenting a particular region of painting 301. In some embodiments, the input may be provided by the user by tagging, touching, and/or otherwise selecting the particular of painting 301. In some other embodiments, point cloud AR/MR mapping system 200 may generate the input automatically by scanning point cloud 303 to determine that the set of data points representing the particular region of painting 301 contain data that may be used to augment or enhance the view of the particular region.

Point cloud AR/MR mapping system 200 may select a first set of data points from a first z-depth layer of point cloud 303 that are aligned with and that represent the particular region of painting 301 in the live view. The first set of data points may represent the brush strokes in the bottom layer of painting 301.

Point cloud AR/MR mapping system 200 may map (at 310) the non-positional data elements from the selected set of data points that capture the characteristics of the bottom layer of painting 301 onto the corresponding points for the particular region of painting 301 where those bottom layer brush strokes were captured. Point cloud AR/MR mapping system 200 may generate (at 312) the AR/MR view by occluding the particular region of painting 301 in the AR/MR view, and by presenting, over the occluded particular region, a visualization generated from rendering the selected set of data points. The visualization may present only the bottom layer brush strokes with the correct colors at the exact positions over the particular region of painting 301 where those bottom layer brush strokes were captured. In other words, the AR/MR view generated by point cloud AR/MR mapping system 200 may remove or hide the top and middle layer brush strokes at the higher z-coordinate positions or z planes from the AR/MR view so that the bottom layer brush strokes are isolated and shown without interference from the other layers of brush strokes. Without the AR/MR view, the bottom layer brush strokes may be hidden from view or may be mixed with the other layers of brush strokes so as to be indiscernible when viewing painting 301 with the augmented or enhanced view.

Point cloud AR/MR mapping system 200 may present (at 314) a UI with which the user may switch the layer of brush strokes and associated color used to augment or enhance the particular region of painting 301. In response to the user switching the augmented or enhanced view to a different top layer, point cloud AR/MR mapping system 200 may again align point cloud 303 with the live view of painting 301 (e.g., a current image of painting 301), may select the set of data points from the z-depth layer of point cloud 303 that match the depth of the selected layer and that represent the brush strokes in the particular region of painting 301, may map (at 316) the non-positional data elements that capture the characteristics of the switched to top layer of painting 301 onto the corresponding points for the particular region of painting 301 where those top layer brush strokes were captured. Point cloud AR/MR mapping system 200 may update (at 318) the AR/MR view to present only the top layer brush strokes with the correct colors at the exact positions over the particular region of painting 301 where those top layer brush strokes were captured. Accordingly, the updated (at 318) AR/MR view provides an augmented or enhanced view of the particular region that isolates and presents the top layer brush strokes (e.g., brush strokes represented by the set of data points with a first set of z-coordinate positions corresponding to the top layer of brush strokes) without interference from the middle and bottom layers of brush strokes (e.g., data points with the same or similar x and y coordinate positions but with a second set of z-coordinate positions corresponding to the middle and bottom layers of brush strokes).

Figure 4:
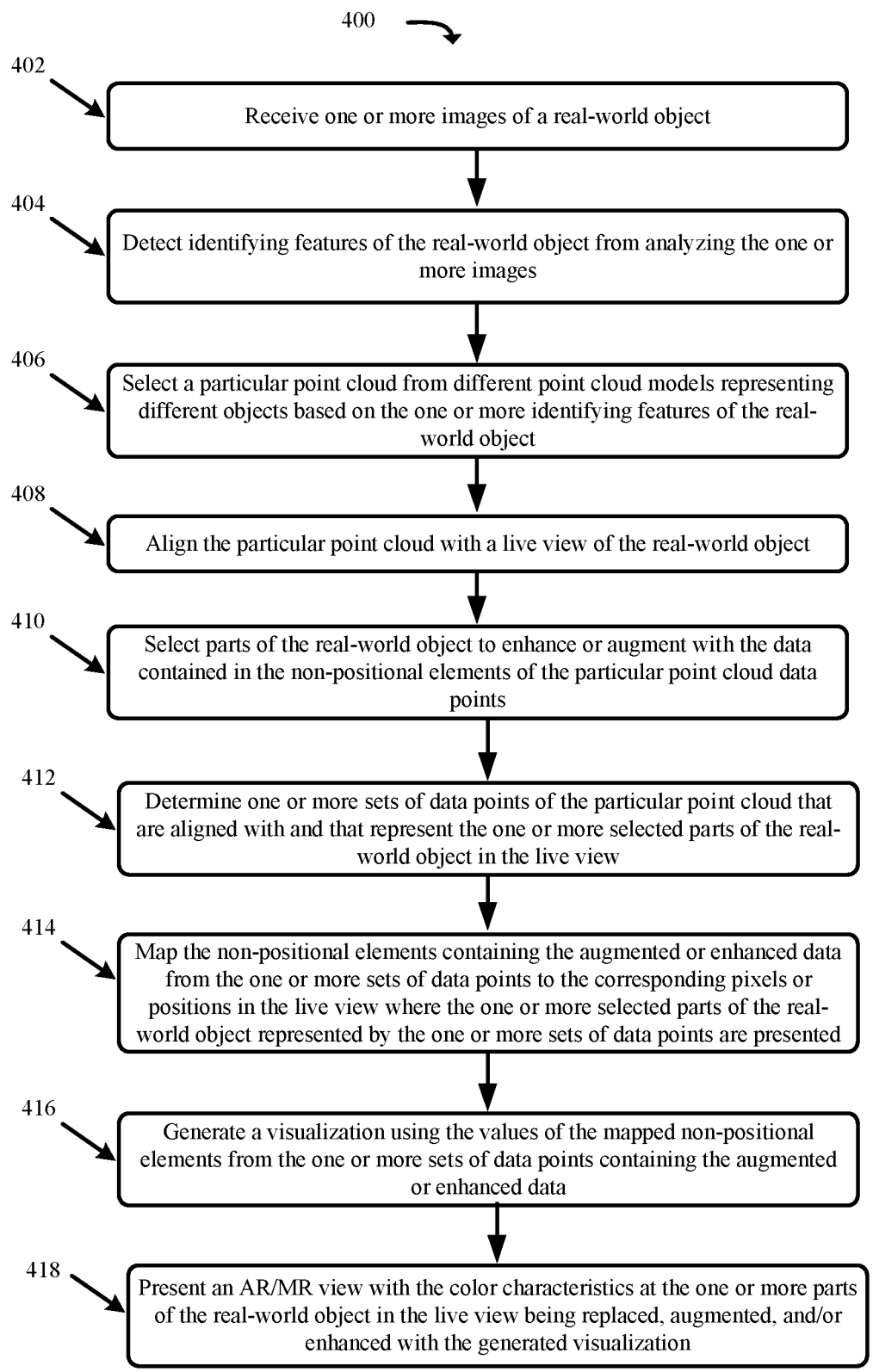
FIG. 4 presents a process for enhancing or augmenting the view of a real-world object by mapping a point cloud overlay directly to the surface or specific parts of the real-world object in accordance with some embodiments presented herein.

FIG. 4 presents a process 400 for enhancing or augmenting the view of a real-world object by mapping a point cloud overlay directly to the surface or specific parts of the real-world object in accordance with some embodiments presented herein. Process 400 may be implemented by point cloud AR/MR mapping system 200. Point cloud AR/MR mapping system 200 may include one or more devices with cameras for capturing a live view of the real-world object, one or more displays for presenting the AR/MR view instead of the captured live view with point cloud overlays mapped over parts of the real-world object, and one or more hardware processors for generating the AR/MR view by enhancing or augmenting the live view with the point cloud overlays.

Process 400 may include receiving (at 402) one or more images of the real-world object from the cameras of point cloud AR/MR mapping system 200. The one or more images may be from the live view of the real-world object, and may capture the object from a particular perspective.

Process 400 may include detecting (at 404) one or more identifying features of the real-world object from analyzing the one or more images. The identifying features may include the shapes, forms, sizes, and/or other structural characteristics at different parts of the real-world object or of the real-world object as a whole. The identifying features may also include coloring, reflectivity, material properties, and/or other descriptive characteristics at the different parts of the real-world object or of the real-world object as a whole.

In some embodiments, point cloud AR/MR mapping system 200 may use one or more artificial intelligence and/or machine learning ("AI/ML") techniques to detect (at 404) the one or more identifying features. The AI/ML techniques may perform pattern recognition, feature recognition, object classification, image comparison, and/or image analysis to detect (at 404) the one or more identifying features, and/or to classify the real-world object based on the one or more identifying features. For instance, the AI/ML techniques may associate a name or label that unique identifies the real-world object based on the identifying features detected (at 404) within the one or more images.

Process 400 may include selecting (at 406) a particular point cloud from different point cloud models representing different objects based on the one or more identifying features of the real-world object. In some embodiments, selecting (at 406) the particular point cloud may include determining that the positional elements and/or non-positional elements of the particular point cloud data points are defined with values that match or are similar, to within a threshold, of the one or more identifying features of the real-world object. For instance, point cloud AR/MR mapping system 200 may determine that the positional elements of one or more sets of data points from the particular point cloud define a shape, form, size, and/or other structural characteristics that match or are similar to the shape, form, size, and/or other structural characteristics detected (at 404) as the one or more identifying feature of the real-world object, and/or that the non-positional elements of the one or more sets of data points specify a pattern of colors, reflectivity, material properties, and/or other descriptive characteristics that match or are similar to a pattern of colors, reflectivity, material properties, and/or other descriptive characteristics detected (at 404) as the one or more identifying features of the real-world object.

In some embodiments, point cloud AR/MR mapping system 200 may classify the real-world object based on the one or more identifying features, and may select (at 406) the particular point cloud that has the same classification as the real-world object. For instance, point cloud AR/MR mapping system 200 may classify the real-world object with the name of a specific painting by a particular artist, and point cloud AR/MR mapping system 200 may select (at 406) the particular point cloud based on the particular point cloud being labeled with the name of the specific painting and the name of the particular artist.

Process 400 may include aligning (at 408) the particular point cloud with a live view of the real-world object. The live view may correspond to a most recent image captured by the cameras of point cloud AR/MR mapping system 200. The cameras may continuously capture (e.g., at 30 frames per second) images of the real-world object, and aligning (at 408) the particular point cloud may include continuously adjusting the alignment in response to the size and shape of the real-world object changing in the images as a result of the camera position or orientation changing or the real-world object moving from one image to a next.

Aligning (at 408) the particular point cloud may include scaling, rotating, and/or otherwise adjusting the particular point cloud so that the positions of the particular point cloud data points match or are aligned with the positions of represented points from surfaces, features, or articles of the real-world object in the live view. In particular, point cloud AR/MR mapping system 200 may identify the sets of data points that have positional elements and non-positional elements in common with the parts of the real-world object captured in the live view, and may adjust the positional elements of all data points uniformly so that the sets of data points are at the same position as the corresponding points on the surface of real-world object represented by that set of data points.

In some embodiments, aligning (at 408) the particular point cloud may include determining a virtual camera position within the 3D space of the particular point cloud that presents the particular point cloud data points at the same angles, locations, distances, etc. in the 3D space as the represented points of the real-world object appear in the live view. In some such embodiments, the alignment (at 408) does not involve modifying the data point positional elements, but rather changing the rendering position or viewpoint from which to visualize the particular point cloud data points.

Process 400 may include selecting (at 410) one or more parts of the real-world object to enhance or augment with the data contained in the non-positional elements of the particular point cloud data points. In some embodiments, point cloud AR/MR mapping system 200 may select (at 410) the one or more parts of the real-world object in response to user input. For instance, a user may invoke one or more interactive tools to select (at 410), from within the live view, which parts of the real-world object the user would like to view with enhanced or augmented data. In some embodiments, point cloud AR/MR mapping system 200 may automatically select (at 410) the one or more parts of the real-world object based on the particular point cloud containing specific values or data with which to enhance or augment specific parts of the real-world object. For instance, the particular point may contain data points encoded with hyperspectral data for a specific part, surface, feature, or article of the real-world object, and may not contain data points that are encoded with hyperspectral data for other parts, surfaces, features, or articles of the real-world object. Accordingly, point cloud AR/MR mapping system 200 may automatically select (at 410) that specific part, surface, feature, or article of the real-world object to enhance or augment while the other parts, surfaces, features, or articles of the real-world object are not selected for enhancement or augmentation.

Process 400 may include determining (at 412) one or more sets of data points of the particular point cloud that are aligned with and that represent the one or more selected (at 410) parts of the real-world object in the live view. In some embodiments, point cloud AR/MR mapping system 200 may determine (at 412) the one or more sets of data points by matching the positioning and color characteristics of the one or more sets of data points from the aligned particular point cloud to the pixels representing the selected (at 410) one or more parts of the real-world object in the live view.

Process 400 may include mapping (at 414) the non-positional elements containing the augmented or enhanced data from the one or more sets of data points to the corresponding pixels or positions in the live view (e.g., current image of the real-world object captured by the cameras) where the one or more selected (at 410) parts of the real-world object represented by the one or more sets of data points are presented. The mapping (at 414) may include identifying each data point in the one or more sets of data points with positional elements and a first set of non-positional elements that match the positioning and color characteristics of a point from one of the selected (at 410) parts of the real world object, and associating values from a second set of non-positional elements of the data point that contain the augmented or enhanced data to that point of the real-world object.

Process 400 may include generating (at 416) a visualization using the values of the mapped non-positional elements from the one or more sets of data points containing the augmented or enhanced data. Generating (at 416) the visualization may include converting the values from the non-positional elements containing the augmented or enhanced data to RGB values that may be presented on a display. For instance, the mapped non-positional elements may represent values of non-visible light captured in different bands of the electromagnetic spectrum, and generating (at 416) the visualization may include converting the non-visible light values from a first band into RGB values, wherein the non-visible light values from the first band may be stored in a first set of the non-positional elements and the non-visible light values from a second band may be stored in a second set of the non-positional elements.

Process 400 may include presenting (at 418) an AR/MR view that includes the live view with the color characteristics at the one or more parts of the real-world object in the live view being replaced, augmented, and/or enhanced with the visualization that is generated (at 416) from the values of the mapped non-positional elements. In other words, point cloud AR/MR mapping system 200 may overlay the non-visible data (e.g., the enhanced or augmented data) from the one or more sets of data points directly onto the surfaces of the real-world object where that non-visible data was captured in order to produce the AR/MR view.

In some embodiments, point cloud AR/MR mapping system 200 may continually align the point cloud with a changing live view, may map the aligned set of data points over the portions of the live view that are selected for augmentation or enhancement, and may update the visualization so that the augmented overlay created by the aligned set of data points moves in concert with augmented or enhanced objects in the live view. In other words, point cloud AR/MR mapping system 200 may continually perform many of the operations from process 400 while the AR/MR functionality is active on a AR/MR device.

Figure 5:
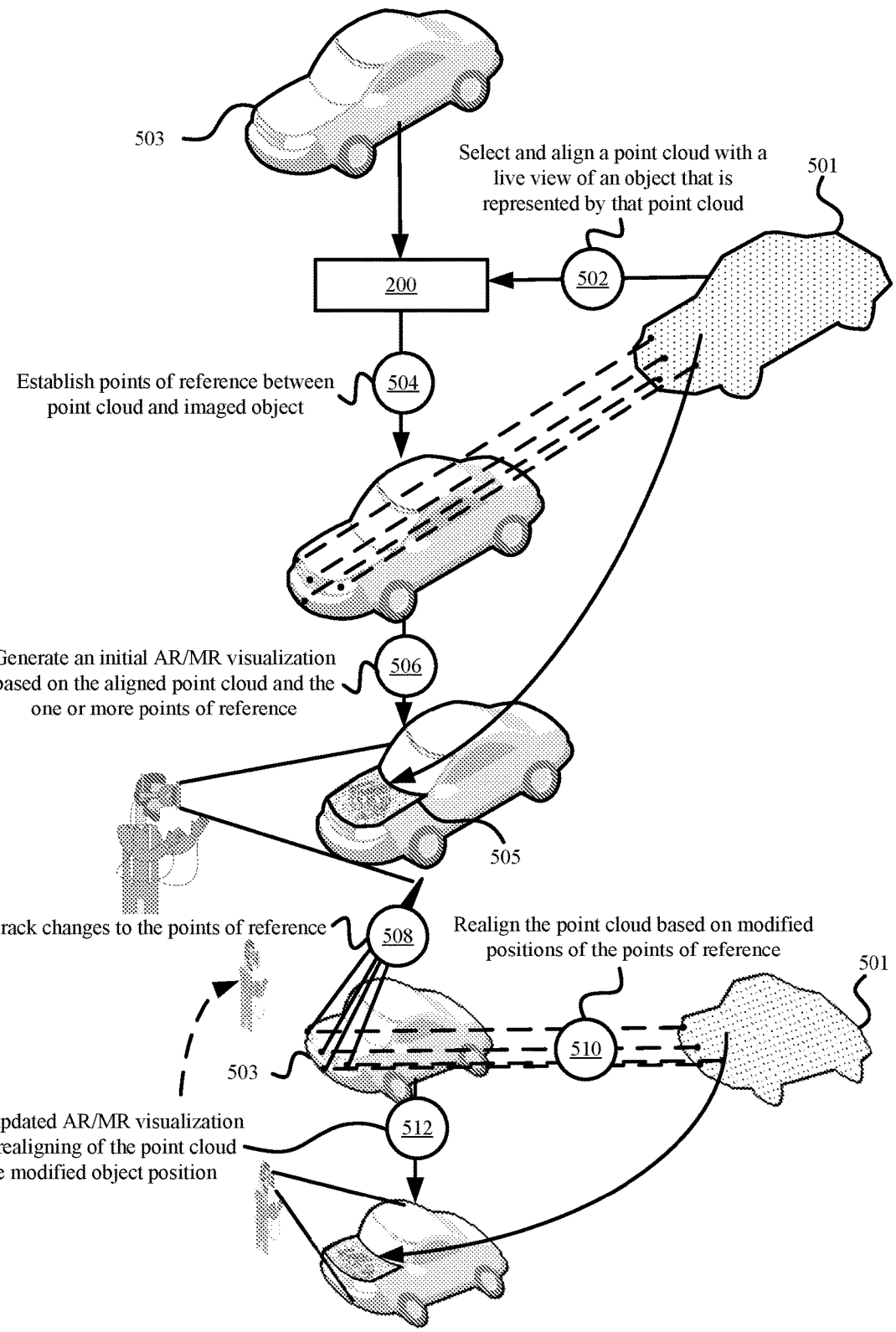
FIG. 5 illustrates an example of updating the AR/MR visualization to retain the alignment between the AR/MR overlay and the live view of an object in accordance with some embodiments presented herein.

FIG. 5 illustrates an example of updating the AR/MR visualization to retain the alignment between the AR/MR overlay and the live view of an object in accordance with some embodiments presented herein. Point cloud AR/MR mapping system 200 may select and align (at 502) point cloud 501 with a live view of object 503 that is represented by that point cloud 501.

Point cloud AR/MR mapping system 200 may establish (at 504) one or more points of reference between different subsets of the point cloud data points and different features about the surface of object 503. Specifically, a point of reference may include a subset of point cloud data points that represent a unique identifying feature of object 503. The subset of point cloud data points and the unique identifying feature may correspond to a part of object 503 where there is a varying and/or distinctive structure or formation and/or where there is a unique pattern or variation in the coloring or visible attributes.

Point cloud AR/MR mapping system 200 may generate (at 506) an initial AR/MR visualization based on the aligned point cloud 501 and the one or more points of reference. The initial AR/MR visualization may involve enhancing or augmenting portion 505 of object 503 captured in a first position or in a first image of the live view with the positional and/or non-positional data from a set of point cloud data points that represent previously captured data from that portion 505 of object 503.

Point cloud AR/MR mapping system 200 may track (at 508) changes or movements to the one or more points of reference as the live view changes. For instance, as the AR/MR headset or device moves, the position of object 503 within the real-world environment will change in the live view. Rather than track movement of the entire object, point cloud AR/MR mapping system 200 may track (at 508) the one or more unique identifying features about the surface of object 503. Tracking (at 508) the changes or movements may include computing a positional offset from a last position to a current position for each unique identifying feature of object 503.

Point cloud AR/MR mapping system 200 may realign (at 510) point cloud 501 to the adjusted view of object 503 by scaling, rotating, and/or otherwise adjusting the point cloud so that the subset of data points, that represent the tracked points of reference in point cloud 501, are aligned with the corresponding unique identifying features of the object, that represent the same tracked points of reference of object 503. Realigning (at 510) point cloud 501 may include applying the positional offsets that were tracked (at 508) for each unique identifying feature of object 503 to the corresponding subset of data points that represent those unique identifying features in point cloud 501.

Point cloud AR/MR mapping system 200 may generate (at 512) an updated AR/MR view by overlaying the positional and/or non-positional data from the set of point cloud data points over portion 505 of object 503 in the updated live view in response to realigning point cloud 501 with the updated position of object 503 in the updated live view. In some embodiments, overlaying (at 512) the positional and/or non-positional data may include replacing portion 505 in the updated live view with a visualization created from rendering the positional and non-positional data of the set of data points from the realigned positions. In some other embodiments, overlaying (at 512) the positional and/or non-positional data may include enhancing or augmenting portion 505 shown in the live view with the additional visualization created from rendering the positional and non-positional data of the set of data points over portion 505. In this manner, point cloud AR/MR mapping system 200 may generate an AR/MR view that directly enhances or augments an object in an imaged environment so that additional non-visible properties of the object may be presented at corresponding positions across the surface of the object where those non-visible properties exist or were captured from a previous scan of the object.

Figure 6:
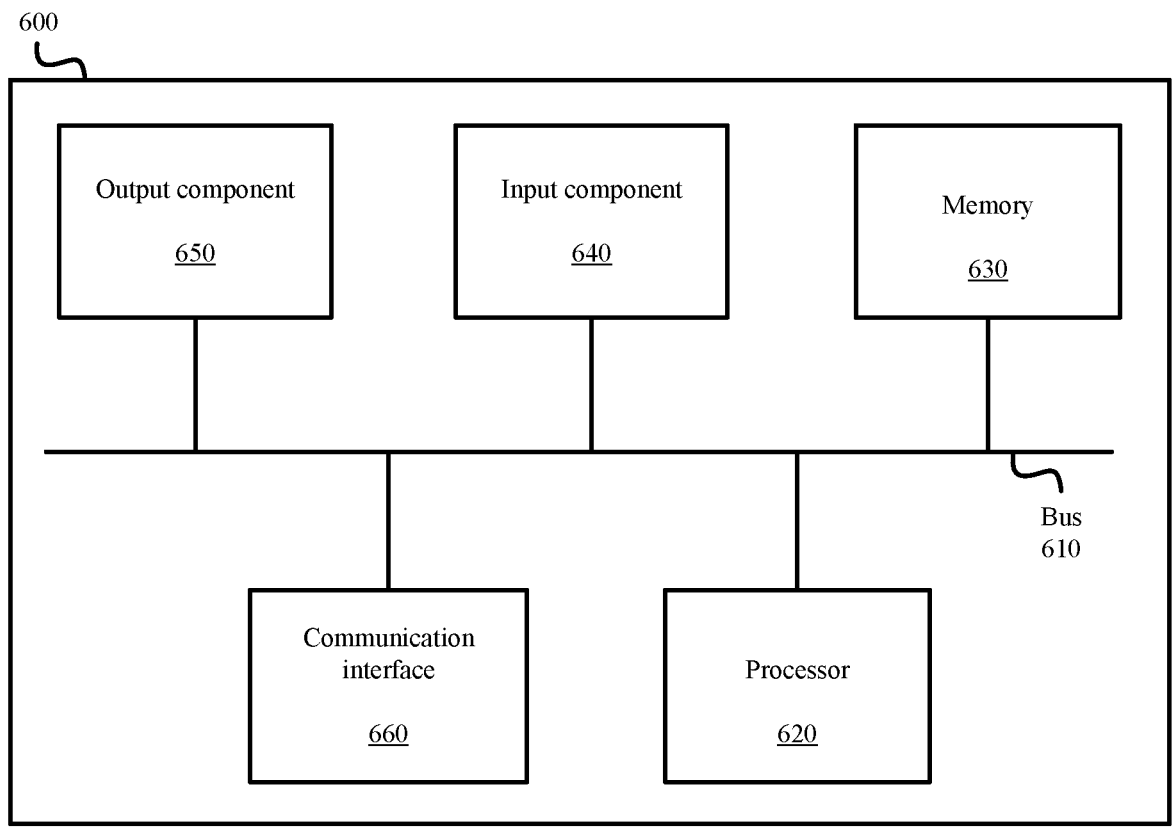
FIG. 6 illustrates example components of one or more devices, according to one or more embodiments described herein.

FIG. 6 is a diagram of example components of device 600. Device 600 may be used to implement one or more of the devices or systems described above (e.g., point cloud AR/MR mapping system 200, AR/MR headset, and/or other AR/MR devices). Device 600 may include bus 610, processor 620, memory 630, input component 640, output component 650, and communication interface 660. In another implementation, device 600 may include additional, fewer, different, or differently arranged components.

Bus 610 may include one or more communication paths that permit communication among the components of device 600. Processor 620 may include a processor, microprocessor, or processing logic that may interpret and execute instructions. Memory 630 may include any type of dynamic storage device that may store information and instructions for execution by processor 620, and/or any type of non-volatile storage device that may store information for use by processor 620.

Input component 640 may include a mechanism that permits an operator to input information to device 600, such as a keyboard, a keypad, a button, a switch, etc. Output component 650 may include a mechanism that outputs information to the operator, such as a display, a speaker, one or more LEDs, etc.

Communication interface 660 may include any transceiver-like mechanism that enables device 600 to communicate with other devices and/or systems. For example, communication interface 660 may include an Ethernet interface, an optical interface, a coaxial interface, or the like. Communication interface 660 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 600 may include more than one communication interface 660. For instance, device 600 may include an optical interface and an Ethernet interface.

Device 600 may perform certain operations relating to one or more processes described above. Device 600 may perform these operations in response to processor 620 executing software instructions stored in a computer-readable medium, such as memory 630. A computer-readable medium may be defined as a non-transitory memory device. A memory device may include space within a single physical memory device or spread across multiple physical memory devices. The software instructions may be read into memory 630 from another computer-readable medium or from another device. The software instructions stored in memory 630 may cause processor 620 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   obtaining an image of an object at a first position;
   selecting a model of the object, wherein the model comprises a plurality of data points, wherein each data point of the plurality of data points comprises positional elements and non-positional elements, wherein the positional elements of a particular data point define a position of a corresponding point on the object, and wherein the non-positional elements of the particular data point define non-positional properties of the corresponding point on the object;
   establishing one or more points of reference between different subsets of the plurality of data points and corresponding points on the object;

mapping a set of the plurality of data points corresponding to a particular feature of the object based on the one or more points of reference; and enhancing the image of the object by presenting values from one or more of the non-positional elements of the set of data points over the particular feature of the object.

2. The method of claim 1 further comprising:
obtaining a second image of the object at a second position;
tracking movement of the one or more points of reference in response to the object moving from the first position to the second position; and
updating the second image of the object by presenting the values from the one or more of the non-positional elements of the set of data points over the particular feature of the object at the second position based on said tracking of the movement of the one or more points of reference.

3. The method of claim 1, wherein mapping the set of data points comprises:
aligning the different subsets of data points over the corresponding points on the object in the image;
determining positioning of the set of data points relative to the different subsets of data points established as the one or more points of reference; and
aligning the set of data points over the particular feature of the object in the image based on aligning the different subsets of data points and determining the positioning of the set of data points relative to the different subsets of data points.

4. The method of claim 3,
wherein aligning the different subsets of data points comprises adjusting the positional elements of the different subsets of data points to match positioning of the corresponding points in the image; and
wherein aligning the set of data points comprises adjusting the positional elements of the set of data points equal to said adjusting of the positional elements of the different subsets of data points.

5. The method of claim 1 further comprising:
tracking movement of the one or more points of reference from a first image to a second image;
computing a positional offset between the one or more points of reference from the first image to the second image; and
realigning the set of data points with the particular feature by applying the positional offset to the positional elements of the set of data points.

6. The method of claim 1 further comprising:
adjusting the positional elements of the plurality of data points based on differences in the positional elements of the different subsets of data points and the corresponding points in the image.

7. The method of claim 6 further comprising:
tracking an offset between the one or more points of reference in the image and a subsequent second image;
readjusting the positional elements of the set of data points according to the offset; and
enhancing the subsequent second image by presenting the values from the one or more of the non-positional elements of the set of data points at positional values resulting from readjusting the positional elements according to the offset.

8. The method of claim 1,
wherein obtaining the image of the object comprises performing a hyperspectral capture of the object; and wherein enhancing the image comprises presenting hyperspectral properties of the particular feature over a visible light image of the particular feature.

9. The method of claim 1 further comprising:
providing an interactive tool for selecting the one or more non-positional elements; and
wherein enhancing the image comprises:
modifying a visualization of the particular feature by presenting values from a first set of the non-positional elements of the set of data points over the particular feature in response to a first selection that is made using the interactive tool; and
modifying the visualization of the particular feature by presenting values from a different second set of the non-positional elements of the set of data points over the particular feature in response to a second selection that is made using the interactive tool.

10. The method of claim 1, wherein mapping the set of data points comprises:
receiving a selection of the particular feature in the image;
determining an offset between the selection and the corresponding points on the object used as the one or more points of reference; and
selecting the set of data points based on the offset and the positional elements of the different subsets of data points.

11. The method of claim 1, wherein establishing the one or more points of reference comprises:
detecting a distinctive structure or formation at the corresponding points of the image; and
determining that the positional elements of the different subsets of data points form the distinctive structure or formation.

12. The method of claim 1, wherein establishing the one or more points of reference comprises:
detecting a unique pattern or variation in coloring at the corresponding points of the image; and
determining that the non-positional elements of the different subsets of data points create the unique pattern or variation in the coloring.

13. The method of claim 1, wherein establishing the one or more points of reference comprises:
scaling or rotating the plurality of data points so that the different subsets of data points become aligned with the corresponding points on the object in the image.

14. A system comprising:
one or more hardware processors configured to:
obtain an image of an object at a first position;
select a model of the object, wherein the model comprises a plurality of data points, wherein each data point of the plurality of data points comprises positional elements and non-positional elements, wherein the positional elements of a particular data point define a position of a corresponding point on the object, and wherein the non-positional elements of the particular data point define non-positional properties of the corresponding point on the object;
establish one or more points of reference between different subsets of the plurality of data points and corresponding points on the object;
map a set of the plurality of data points corresponding to a particular feature of the object based on the one or more points of reference; and
enhance the image of the object by presenting values from one or more of the non-positional elements of the set of data points over the particular feature of the object.

15. The system of claim 14, wherein the one or more hardware processors are further configured to:
   obtain a second image of the object at a second position;
   track movement of the one or more points of reference in response to the object moving from the first position to the second position; and
   update the second image of the object by presenting the values from the one or more of the non-positional elements of the set of data points over the particular feature of the object at the second position based on said tracking of the movement of the one or more points of reference.

16. The system of claim 14, wherein the one or more hardware processors are further configured to:
   track movement of the one or more points of reference from a first image to a second image;
   compute a positional offset between the one or more points of reference from the first image to the second image; and
   realign the set of data points with the particular feature by applying the positional offset to the positional elements of the set of data points.

17. The system of claim 14, wherein the one or more hardware processors are further configured to:
   adjust the positional elements of the plurality of data points based on differences in the positional elements of the different subsets of data points and the corresponding points in the image.

18. The system of claim 17, wherein the one or more hardware processors are further configured to:
   track an offset between the one or more points of reference in the image and a subsequent second image;
   readjust the positional elements of the set of data points according to the offset; and
   enhance the subsequent second image by presenting the values from the one or more of the non-positional elements of the set of data points at positional values resulting from readjusting the positional element according to the offset.

19. The system of claim 14, wherein the one or more hardware processors are further configured to:
   provide an interactive tool for selecting the one or more non-positional elements; and
   wherein enhancing the image comprises:
      modifying a visualization of the particular feature by presenting values from a first set of the non-positional elements of the set of data points over the particular feature in response to a first selection that is made using the interactive tool; and
      modifying the visualization of the particular feature by presenting values from a different second set of the non-positional elements of the set of data points over the particular feature in response to a second selection that is made using the interactive tool.

20. A non-transitory computer-readable medium storing program instructions that, when executed by one or more hardware processors, cause a computing system to perform operations comprising:
   obtaining an image of an object at a first position;
   selecting a model of the object, wherein the model comprises a plurality of data points, wherein each data point of the plurality of data points comprises positional elements and non-positional elements, wherein the positional elements of a particular data point define a position of a corresponding point on the object, and wherein the non-positional elements of the particular data point define non-positional properties of the corresponding point on the object;
   establishing one or more points of reference between different subsets of the plurality of data points and corresponding points on the object;
   mapping a set of the plurality of data points corresponding to a particular feature of the object based on the one or more points of reference; and
   enhancing the image of the object by presenting values from one or more of the non-positional elements of the set of data points over the particular feature of the object.

* * * * *